(12) United States Patent
Guy et al.

(10) Patent No.: US 7,341,660 B1
(45) Date of Patent: Mar. 11, 2008

(54) UNITARY THREE STAGE WASTEWATER TREATMENT SYSTEM

(75) Inventors: Monroe Wayne Guy, Baton Rouge, LA (US); Michael D. Catanzaro, Baton Rouge, LA (US); Raleigh Lee Cox, Baton Rouge, LA (US); Christopher Edward Cox, Denham Springs, LA (US)

(73) Assignee: Pentair Pump Group, Inc., Golden Valley, MN (US)

( * ) Notice: Subject to any disclaimer, the term of this patent is extended or adjusted under 35 U.S.C. 154(b) by 402 days.

(21) Appl. No.: 10/960,814

(22) Filed: Oct. 7, 2004

(51) Int. Cl.
*C02F 3/00* (2006.01)
(52) U.S. Cl. .................... 210/220; 210/532.2
(58) Field of Classification Search ............. 210/532.2, 210/220
See application file for complete search history.

(56) References Cited

U.S. PATENT DOCUMENTS

| | | | |
|---|---|---|---|
| 1,115,857 A * | 11/1914 | Nabstedt .................... 210/261 |
| 1,337,431 A | 4/1920 | Berry ......................... 210/320 |
| 1,381,615 A | 6/1921 | Beeby ........................ 210/320 |
| 1,715,466 A * | 6/1929 | Miller ........................ 52/236.2 |
| 2,383,302 A | 8/1945 | Feinauer et al. ........... 210/320 |
| 2,901,114 A * | 8/1959 | Smith et al. ................ 210/200 |
| 3,057,796 A | 10/1962 | Davis ........................ 210/630 |
| 3,495,711 A | 2/1970 | Englesson et al. ....... 210/195.3 |
| 3,784,012 A * | 1/1974 | Carlson ................. 210/170.08 |
| 3,796,321 A | 3/1974 | Kosonen ..................... 210/202 |
| 3,898,162 A * | 8/1975 | Carlson et al. ........ 210/170.08 |
| 3,907,672 A | 9/1975 | Milne |
| 3,980,556 A | 9/1976 | Besik ............................. 210/6 |
| 3,994,802 A | 11/1976 | Casey et al. .................... 210/5 |
| 4,054,524 A | 10/1977 | Mackrle et al. ............. 210/195 |
| 4,650,577 A | 3/1987 | Hansel |
| 4,664,795 A | 5/1987 | Stegall et al. ............... 210/202 |
| 4,882,046 A * | 11/1989 | Waite ...................... 210/195.3 |
| 4,983,285 A | 1/1991 | Nolen ......................... 210/197 |
| 5,055,186 A | 10/1991 | Van Toever |
| 5,104,542 A * | 4/1992 | Dixon et al. ............. 210/532.2 |
| 5,162,083 A * | 11/1992 | Forbes et al. ............... 210/199 |
| 5,207,899 A | 5/1993 | Boyle .......................... 210/138 |
| 5,221,470 A | 6/1993 | McKinney ................... 210/151 |
| 5,266,239 A | 11/1993 | Drewery ..................... 261/64.3 |
| 5,308,479 A * | 5/1994 | Iwai et al. ................... 210/151 |
| 5,407,564 A | 4/1995 | Thrailkill .................... 210/167 |
| 5,427,334 A | 6/1995 | Rauscher ................. 244/135 R |
| 5,484,524 A | 1/1996 | MacLaren et al. |

(Continued)

OTHER PUBLICATIONS

Southern Manufacturing Brochure for "The Southern".

(Continued)

*Primary Examiner*—Chester T. Barry
(74) *Attorney, Agent, or Firm*—Jones, Walker, Waechter, Poitevent, Carrere & Denegre, L.L.P.

(57) ABSTRACT

The invention is a three stage wastewater treatment system having a first tank, a second tank and a third tank, all in fluid communication and forming a unitary structure. The first and second tanks are nested, where the first tank is the innermost tank. The first tank has a clarifier structure disposed therein separating the interior of the first tank into a quiescent zone and an aeration zone. Positioned in the aeration zone is at least one air injector positioned. The treatment system is covered, and is generally buried (but can be used above ground).

11 Claims, 5 Drawing Sheets

U.S. PATENT DOCUMENTS

| | | | |
|---|---|---|---|
| 5,490,935 A | 2/1996 | Guy | 210/620 |
| 5,549,818 A | 8/1996 | McGrew, Jr. | 210/195.4 |
| 5,783,071 A | 7/1998 | Guy | 210/195.1 |
| 5,874,002 A | 2/1999 | Cormier | 210/626 |
| 5,879,550 A | 3/1999 | Cox | 210/195.4 |
| 5,954,951 A | 9/1999 | Nuccio | |
| 5,985,149 A | 11/1999 | Raetz et al. | 210/617 |
| RE36,660 E | 4/2000 | Goldman et al. | 210/138 |
| 6,180,004 B1 | 1/2001 | Drewery | |
| 6,200,472 B1 * | 3/2001 | Donald et al. | 210/195.1 |
| 6,217,761 B1 | 4/2001 | Catanzaro et al. | |
| 6,358,411 B1 * | 3/2002 | McKinney | 210/170.08 |
| 6,406,619 B1 * | 6/2002 | Donald et al. | 210/151 |
| 6,416,664 B1 * | 7/2002 | Bovington | 210/238 |
| 6,979,398 B2 * | 12/2005 | Veilleux et al. | 210/143 |
| 6,982,033 B2 * | 1/2006 | Donald et al. | 210/207 |
| 2006/0021935 A1 * | 2/2006 | Kim | 210/532.2 |

OTHER PUBLICATIONS

Delta Fiberglass & Environmental Products Brochure for the "ECO-TECH 500 Camp Unit".
Delta Fiberglass Drawing #A-1625.
Delta Environmental Drawing #00013.
Southern Manufacturing Brochure for "The Southern", date unknown.
Delta Fiberglass & Environmental Products Brochure for the "ECO-TECH 500 Camp Unit", date unknown.
Delta Fiberglass Drawing #A-1625, Apr. 5, 1994.
Delta Environmental Drawing #00013, Jan. 11, 1995.

* cited by examiner

UNITARY THREE STAGE WASTEWATER TREATMENT SYSTEM

FIELD OF THE INVENTION

This invention relates to multi-tank wastewater treatment systems, and more particularly, to three stage or three tank treatment systems.

BACKGROUND OF THE INVENTION

Residential and small commercial sewage treatment systems are subject to ever tightening treatment standards. In response to these evolving stricter treatment standards, treatment systems are becoming more complex. Prior art treatment systems include septic systems and aerobic treatment systems. Generally, aerobic treatment systems include an aeration zone and a clarifier zone, as epitomized by U.S. Pat. No. 4,650,577 to Hansel. The Hansel device includes: (1) an aeration zone where air is injected into the wastewater, creating a turbulent volume where mixing occurs; and (2) a clarifier structure, creating a separate quiescent zone within the interior of the clarifier structure to allow for settlement of suspended solids. The Hansel aerobic treatment system is one example of a suspended growth treatment system, called such because the treating bacteria mass is suspended within the fluids.

Another type of aerobic treatment system is a fixed film treatment system. The fixed film systems generally employ a bioreactor containing growth media that is suspended in the wastewaters. The growth media are structures (such as sheets of fiberglass or plastic, or small floating spheres or cubes) through which wastewater can flow over or through and present a surface area to which the bacteria can attach and grow on. Examples of such fixed film reactors are shown in U.S. Pat. Nos. 5,484,524 to MacLaren and 5,308,479 to Iwai. In these types of systems, the bioreactor's film is fixed. These types of systems are also considered aerobic treatment systems as air is injected into the wastewater system to allow for aerobic digestion by the bacterial mass.

Later developments in aerobic treatment systems include combining the aerobic treatment chamber with additional staged treatment tanks. For instance, U.S. Pat. No. 6,200,472 to Johnson discloses a central aerobic treatment tank combined with two additional tanks: (1) a pretreatment tank inserted into the system before the aerobic treatment tank, and (2) a post treatment tank inserted into the system after the aerobic treatment tank. The pretreatment tank operates as a settling tank or trash tank. Additionally, because air injection does not occur in the pretreatment tank, the wasters in the pretreatment tank are contained in an anaerobic environment whereby nitrate reduction is favored. The post treatment tank functions as an extended "external" clarifier, adding storage capacity for treated waters. The post treatment tank can also operate as a dosing tank that allows for the controlled release or discharge of effluent, when waters in the dosing tank reach a predetermined level. Such a system is described in Johnson, U.S. Pat. No. 6,200,472.

There are a number of "three tank" configurations in the industry. The general design is that of three tanks or zones arranged in a linear, sequential layout: a first pretreatment tank, joined to a second aerobic treatment tank; the second aerobic tank joined to a third post treatment or dosing tank. These treatment systems are designed to be buried at the installation site. Much effort has gone into joining three tanks into a single unitary linear unit. "Unitary" is used in the sense of a single structure which may be composed of a series of joined structures (such as multiple tanks) integrated into a unit which can be transported as a single unit. For instance, two tanks physically separated but fluidly connected by a pipe are not considered a unitary structure.

The manufacturer builds a unitary three tank system at the manufacturing plant, and delivers it pre-plumbed to the distributor or installer. Because the internal plumbing (that between the three tanks) is assembled by the manufacturer, each system can be tested for leakage prior to shipping thereby reducing the risks and costs of customer callbacks. This is an important feature, as installation includes burying the system on site, and later discovered leaks are expensive to repair. The installer need only to connect the influent and effluent plumbing in to and out of the system at the installation site, and test the same for leakage.

An added benefit of a single unitary tank is that this system presents a smaller footprint, reducing the size of the burial hole than would be required for multiple tanks joined on site. Exemplary three tank or three zone linear systems are shown in U.S. Pat. Nos. 6,406,619 to Johnson; 6,200,472 to Johnson; 6,180,004 to Drewery; 5,055,186 to Van Toever; and 3,907,672 to Milne, all incorporated by reference.

However, because the three tanks are generally laid out in a linear fashion, joined edge to edge (such as shown in the Johnson or Drewery patents), the footprint of such a linear arrangement is an elongated oval shape or rectangular shape. This elongated shape makes it difficult for the manufacturer to ship multiple units on a flatbed. While the unitary three tank system elongated footprint is smaller than that of three individual tanks joined at the installation site, it would ease transportation costs if the footprint could be further reduced as the elongated unit makes it difficult for the manufacturer to ship multiple units on a flatbed.

To further reduce the footprint and also to reduce the weight of unitary three tank systems, some manufacturers construct the three tank system with shared common walls between the tanks. Such a shared wall design is shown in the Johnson patents. However, the connection or join along the common walls (between the end tanks and center aerobic tanks) creates an increased possibility of leakage at these joins.

SUMMARY OF THE INVENTION

The invention is a three tank aerobic treatment system having at least one tank-in-tank system, with the innermost tank of the tank-in-tank system being the aerobic treatment zone.

OBJECTS OF THE INVENTION

It is an object of the invention to provide a three tank treatment system having a smaller footprint than existing systems.

It is another object of the invention to provide a three tank system using at least one tank-in-tank treatment system.

It is an object of the invention to provide a three stage treatment system using at least two nested tanks.

DETAILED DESCRIPTION OF THE INVENTION

The invention is a three tank aerobic treatment system utilizing at least one dual stage "tank-in-tank" subsystem. In one embodiment, the invention is a three stage "tank-in-tank-in tank." In another embodiment, the invention is a tank-in-tank with an attached sidecar tank.

Figure 1:
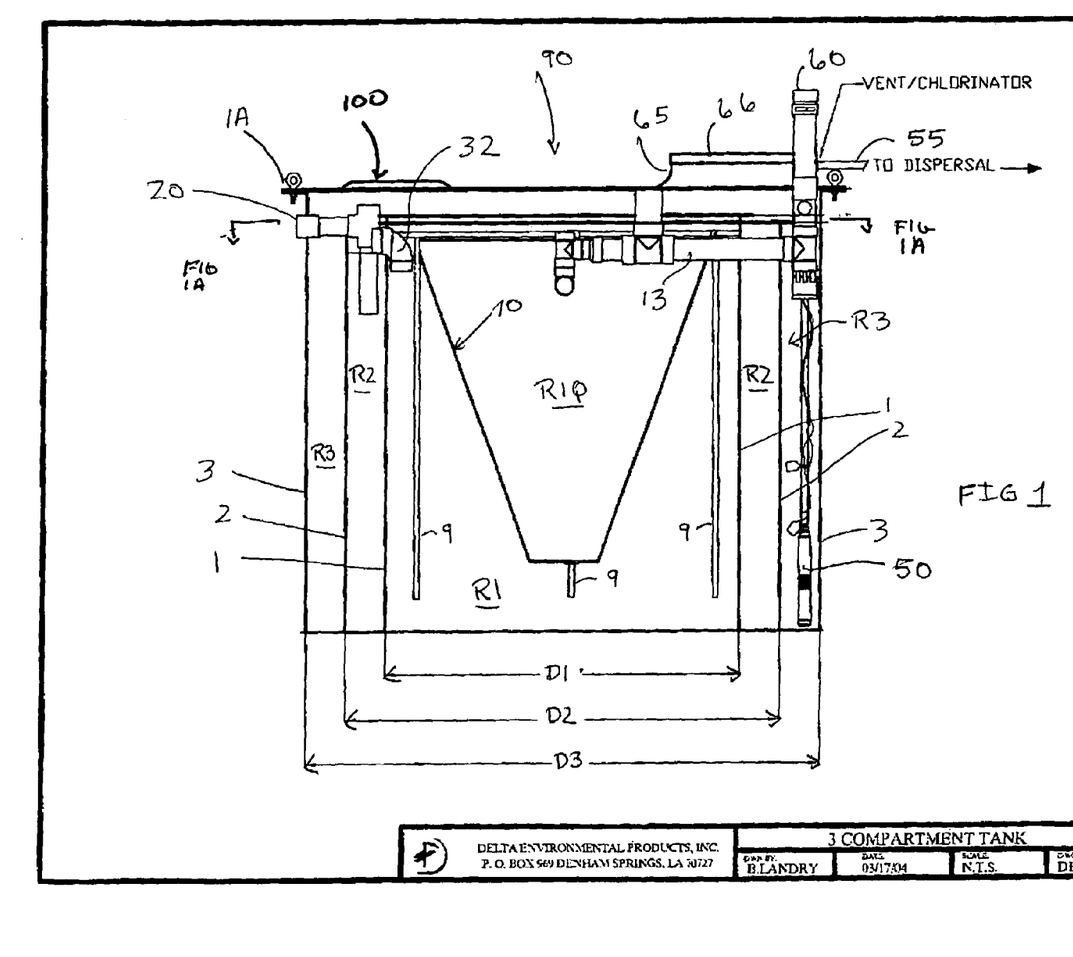
FIG. 1 is a vertical cross-section through one embodiment of a tank-in-tank-in tank system.

One embodiment of the tank-in-tank-in-tank ("TTT") is shown in FIG. 1. Shown in FIG. 1 is a series of three concentric cylinders, cylinder 1, 2, and 3. The inner cylinder 1 defines an innermost treatment region interior to cylinder 1. The innermost treatment zone is separated into two zones by the clarifier structure 10: an aeration treatment zone R1 external to the clarifier structure 10, and a quiescent zone R1Q internal to the clarifier structure 10. The volume between cylinder 1 and cylinder 2 defines a second treatment region R2, and finally, the volume between cylinders 2 and 3 defines a third treatment region, R3. Each cylinder may have a separate cover, or the entire series of nested cylinders can have a single cover. In the embodiment shown in FIG. 1, R2 is the pretreatment zone located in the middle positioned annulus region, and R3 is the post treatment zone located in the outer annular region. In the embodiment shown in FIG. 2, R2 is the pretreatment tank located in the outer annular region, while R3 is the pretreatment tank located in the middle annular region. This TTT system is a modified expanded version of a tank-in-tank described in U.S. Pat. No. 5,951,860, herein incorporated by reference.

In the system configuration in FIG. 1, influent is received through inlet 20 into region R2. As shown, the inlet 20 discharges into the zone at about a foot below the water level in the region R2. This prevents disturbance of any floating scum layer. Fluid flows by gravity flow from region R2 to the aeration treatment zone R1 through pipe 32. Effluent is removed from the aeration treatment zone R1 to the post treatment zone R3 by pipe 13, and more particularly, effluent is removed from the quiescent zone R1Q of the aeration treatment zone R1. Quiescent zone R1Q is formed interior to the clarifier structure 10. The clarifier structure shown is an inverted truncated cone 10, having an open top and bottom, similar to that disclosed in the Hansel reference. Other clarifier structure shapes are known in the art. For instance, the clarifier structure could be a partition separating the interior of the innermost tank into two half cylinders, one of the half cylinders equipped with airdrops and forming the aeration zone, the other half cylinder lacking airdrops and forming a quiescent zone, where the two zones are in fluid communication (for instance, the partition would be open along the bottom section). As in the Hansel device, the aeration treatment zone R3 contains airdrops 9 (PVC tubing) connected to an air distribution manifold, where the airdrops are open on the bottom forming air injectors 111. The air injectors are positioned near the bottom of the aeration zone R1. When connected to a compressor or air pump, air is injected into the aeration zone through the open end of air injectors 111. Various designs are known for the air injectors, such as using a diffuser positioned on terminal end of the air drop 9, or using a slit open end on the air drop, such as shown in U.S. Pat. No. 5,954,951. Air injectors, however, are generally lacking from the quiescent zone R1Q to allow for settlement of suspended particles in the quiescent zone, which then exit the quiescent zone R1Q through the open bottom of the clarifier structure. These settled particles then reenter the aeration zone R1 where further treatment takes place.

Figure 1A:
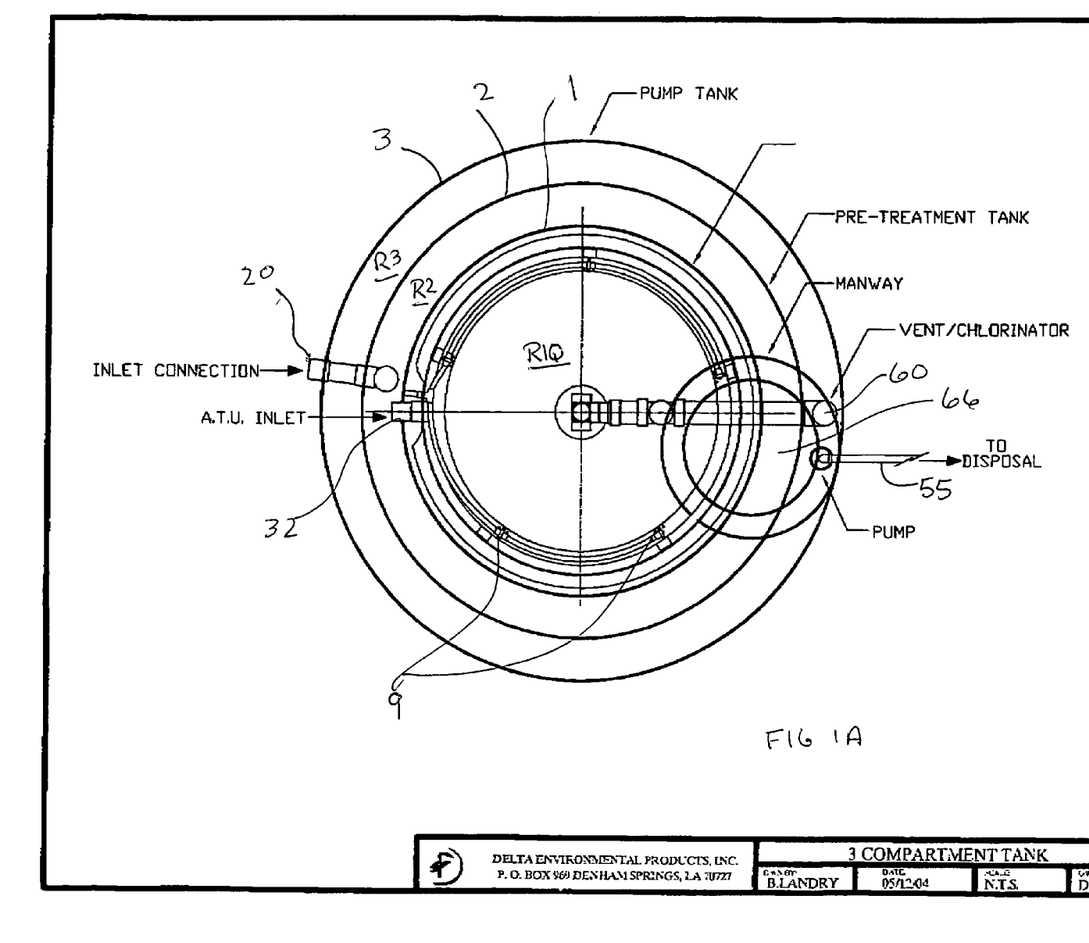
FIG. 1A is a horizontal cross-section of the preferred embodiment of FIG. 1.

Pipe 13 empties into post treatment zone R3. As shown, pipe 13 terminates in a chlorinator 60 prior to emptying into post treatment zone R3. The chlorinator 60 is well known in the art, and can be replaced with another disinfection device, such as a UV light device. Positioned in the post treatment zone R3 is a dosing pump 50. Dosing pumps are well known in the art, and function to remove fluid from zone R3 when fluid levels in R3 reach a predetermined level or levels. Effluent leaves region R3 via output pipe 55 through the pumping action of dosing pump 50. Output pipe 55 may feed into a field drain system or leaching field, not shown. The geometry of the TTT system is more clearly shown in FIG. 1A, a vertical cross-section of the TTT of FIG. 1.

As shown in FIG. 1, the three tank system is covered and has at least one riser 65 with detachable lid 66 (together defining a man-way) to provide access to the interior of the treatment system for maintenance purposes. Additional man-ways or openings may be required if maintenance items are physically separated. Maintenance items can include the dosing pump and the air injector system. Also, it may be necessary to access each region periodically to remove sludge that settles and builds up at the bottom of the regions. Sludge removal may be accomplished by suctioning or pumping the sludge with a suction tube type device. Finally, chlorinator 60 or other disinfection device may optionally be incorporated into discharge pipe 55 of the dosing pump, either within the interior of the post-treatment region or external to the tank (not shown). Obviously, a disinfection device will also require periodic maintenance. Not shown are vent pipes to vent the interior sections.

As can be seen in FIG. 1 in the preferred embodiment, the tank height varies slightly: the outermost tank being slightly taller than the inner tanks. This allows for common ventilation of all three tank regions and provides for manufacturing tolerances when assembling the TTT system. As shown, the outermost cylinder tank wall 3 includes an annular flange section 1A to allow attachment of the top 90 to the outermost wall. As the outermost tank is slightly taller than the interior tanks, the top 90 can be attached to the tank system without interference from the walls of the inner tanks. When a flat lid configuration is utilized as the top cover 90, it is desirable that the cover be supported at more than just the edges of the outer cylinder to prevent flexing of the top 90, or alternatively, that re-enforcing ridges 100 be located on the cover. To allow the top to contact the walls of the inner cylinders 1 and 2, the cylinder height can be raised in whole or partly at designated positions along the perimeter of the top cylinders 1 and 2. Alternatively, the top 90 can have downward projecting flange sections that rest against the top(s) of the inner cylinders walls 1 or 2 or both. Finally, the top 90 of the outer cylinder can be domed shape, much like a silo (not shown), that provides the needed rigidity.

One TTT embodiment uses about a 1000 gallon treatment tank creating the aeration zone R1, with an effective height of about 70 inches and an inner tank diameter D1 of about 5.5 feet. The zone next to the aeration treatment zone is that of the pretreatment zone R2 having a capacity of about 500 gallons, created by using a tank with a diameter D2 of about 6.75 feet. The final zone, the post treatment zone R2, with a capacity of about 670 gallons, is created by using a tank with diameter D3 of 8 feet. Hence, the entire 1000 gallon treatment system presents a total footprint of an 8 foot diameter cylinder. As described and shown, the nested tanks share a common center and are all shown as cylinders, thereby the outer tanks form an annular volume. This arrangement is not required, but is preferred when fiberglass is used as the primary tank construction material.

When fiberglass is used as the construction material, assembly of the three tank system is simplified using cylindrical tanks. Each tank is separately constructed of resin impregnated fiberglass. The chop and spray method is used that sprays a chopped fiberglass/resin mixture onto a rotating mold, sized for the particular tank under construction. After the sprayed material hardens, it is released from the mold, creating an open top cylindrical tank. The completed tank may require finishing work on the open top, which can have rough edges. Once all three sized tanks are constructed, the outermost tank (defined by wall 3) is turned upside down and a center circular opening is cut into the floor section, the center opening being of approximately the same size as that of the diameter of the middle tank (defined by wall 2). The middle tank is also turned upside down and has a centered circular opening cut into the floor, the diameter of this opening being approximately the same size as that of the innermost tank, defined by wall 3. The three tanks are then assembled upside down in a nested fashion, and the bottom is glassed (again with the cut and spray method) to create a sealed common bottom across the three tank system. The three tanks could be simply resined or glassed together without cutting openings in the bottoms, but such an arrangement results in a heavier tank, as portions of the bottoms are duplicated. Again, the nested tanks need not be centered, but such an arrangement is easy to manufacture.

Figure 2:
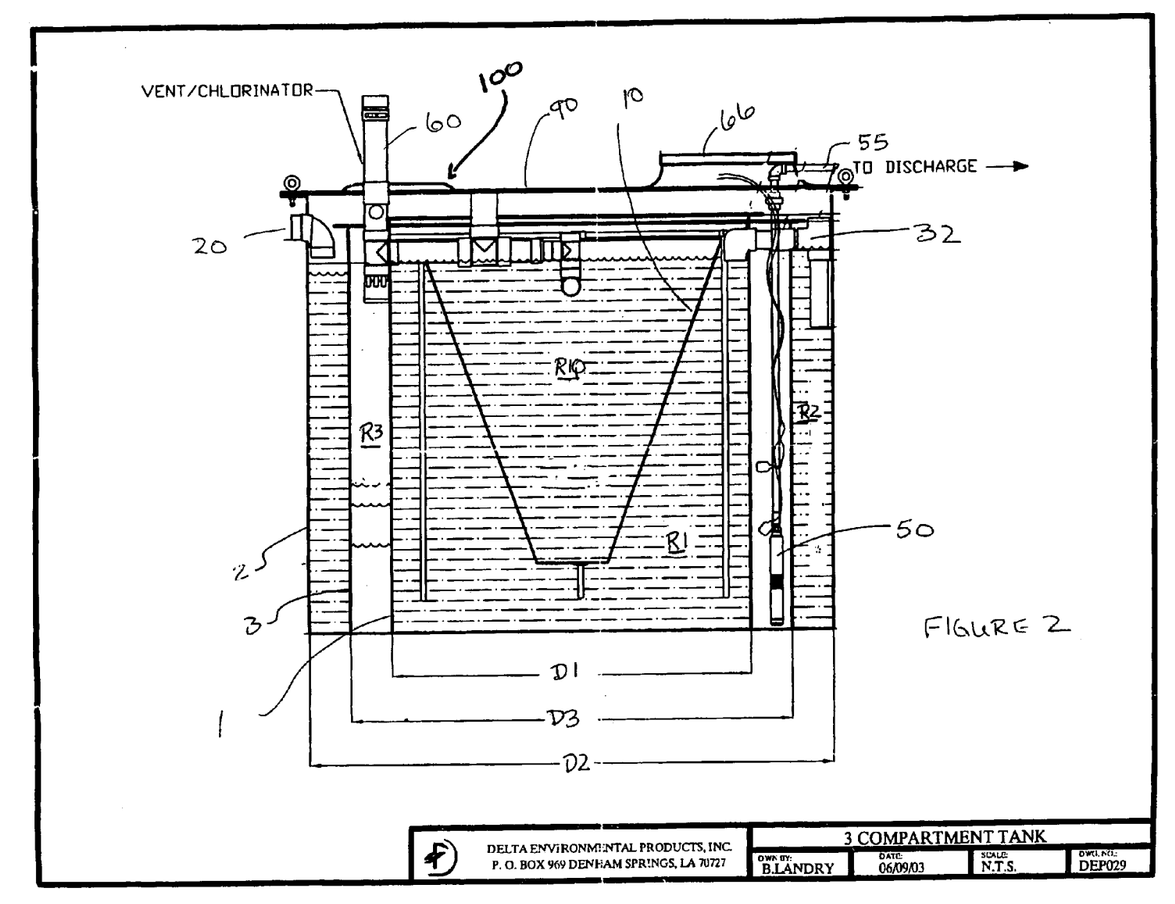
FIG. 2 is a vertical cross-section of another embodiment of the tank-in-tank-in tank system.

As shown in FIG. 2, the relationship between the pretreatment zone and the post treatment zone can be interchanged. Also as shown in FIG. 2, the effluent taken from the clarifier is chlorinated prior to discharge into the post treatment zone R3. Chlorination can also be accomplished when discharging from the pre-treatment tank. As indicated in FIG. 2, the liquid levels in the aeration zones and the pretreatment zones will be almost identical. However, the liquid level in the post treatment zone may be substantially lower than that of the adjacent tanks, and hence, the walls forming the post treatment may require stiffening to counter the differential pressures, such as with blocks, spacers, or thicker sidewalls. Within the post treatment zone, it may be necessary to install spacers between the inner and outer wall defining the zone. The spacers can be used to counter the differential pressures that can be present on these walls, but should not prevent flow within the annular tank volume. For instance, plastic blocks wedged between the tank walls which form the post-treatment zone (in FIG. 1, the blocks would be wedged between walls 2 and 3) could be utilized as spacers.

The tank-in-tank-in-tank system, for smaller sized systems, presents a viable and economic alternative to in-line series tanks, resulting in a compact, easily installed system without leakage seams. However, as tank size grows, raw material requirements rise. Hence, another embodiment uses a tank-in-tank with an attached side chamber. One such embodiment is shown in FIG. 3.

Figures 3, 3A, 4:
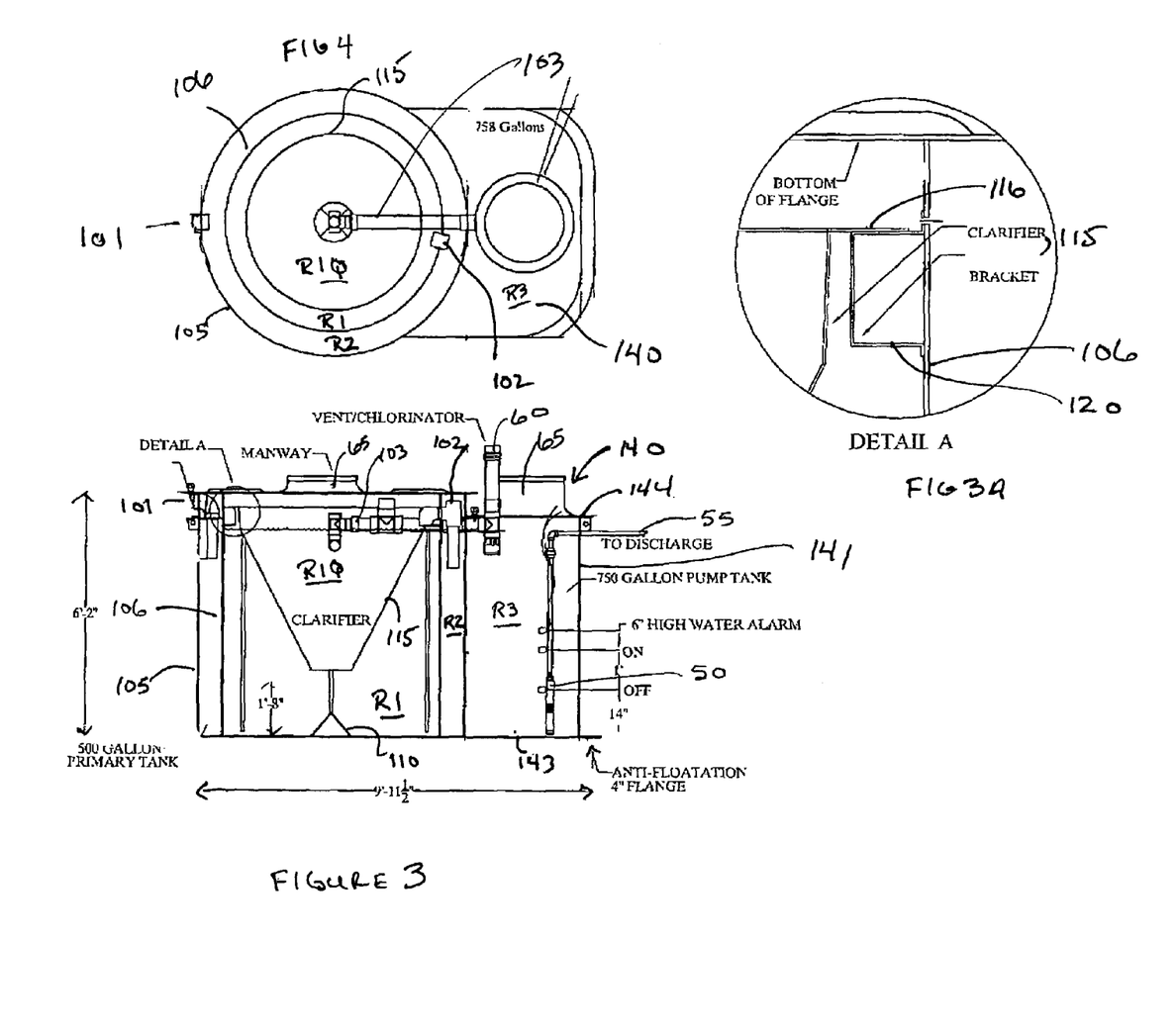
FIG. 3 is a vertical cross-section of one embodiment of the tank-in-tank plus sidecar system.
FIG. 3A is a detail showing the clarifier flange.
FIG. 4 is a horizontal cross-section of one embodiment of the tank-in-tank plus sidecar system

Shown in FIG. 3 and FIG. 4 is a tank-in-tank system with a side compartment. The tank-in-tank is similar in construction to the two innermost tanks shown in FIG. 1. The outermost tank is a cylinder defined by wall 105, while the inner tank is a cylinder defined by wall 106. The area interior to the inner tank defines an aeration zone R1, having airdrops 9 positioned in the aeration zone R1. A second volume, the quiescent zone R1Q, is created within the aeration zone R1 by the clarifier structure 115 placed therein. As before, the preferred structure for the clarifier is an inverted truncated cone suspended in the aeration zone, but other geometries are possible. Also shown in FIG. 4 is a deflector cone 110 positioned at the open bottom end of the clarifier, to divert solids which settle out of the quiescent zone into the active aeration zone. In certain airdrop configurations, such as those disclosed in U.S. Pat. No. 6,217,761 (hereby incorporated by reference), the deflector is unnecessary. As shown in the detail of FIG. 3A, the clarifier structure 115 has a top annular flange section 116, which rests on brackets 120 attached to wall 106, thereby supporting the clarifier. The volume between the tank walls 115 and 116 defines a pretreatment zone, R2. Influent flows into region R2 through influent pipe 101, and fluid then flows into the aeration zone R1 through pipe 102. Treated effluent is removed from the interior of the clarifier in the aeration zone via pipe 103 (the opening into the pipe is generally a "T" shaped PVC fitting, with two openings located below the water level and a third vent opening above the water level, as shown in FIG. 3. Pipe 103 extends through the pretreatment zone R2 to empty into the attached side chamber 140.

Side chamber 140 is defined by exterior wall 141. Side chamber includes a bottom portion 143 and a top portion 144. In the preferred embodiment, the wall of the side chamber 140 adjacent the tank-in-tank is a common wall with the tank-in-tank outer wall 105. It is preferred that the side chamber tank 140 share a common wall with the tank-in-tank (to reduce weight and material requirements), but not required. The side chamber tank could be a completely enclosed separate tank which is then rigidly attached to the tank-in-tank.

Figure 6:
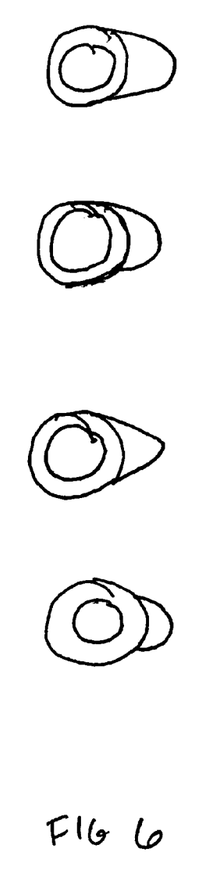
FIG. 6 is a series of horizontal cross-sections showing alternative geometries of the side car tank.

As shown in FIG. 4, the side chamber 140, in horizontal cross-section, is arched shape. The shape of the side chamber can vary, dependent on the size requirements, construction requirements and ease of attachment to the outer wall of the tank-in-tank. Other possible shapes include triangular (preferred to be rounded at the point), semi-circular, or oval, as shown in FIG. 6. Rectangular or square shaped tanks could also be used, but if the construction is of fiberglass, the edges of a square shaped sidecar tank 140 are potential weak points. Placed in the sidecar tank 140 is dosing pump 50, which discharges through discharge pipe 55. Tank-in-tank and sidecar tank 140 each have a manway 65, again, providing access to the tank interiors for maintenance of the buried system.

In construction, the sidecar tank 140 is also built using the chop and spray method, using a form or mold. The shape of the mold will substantially mimic the shape of the selected sidecar tank geometry, having one open side that will be later glassed or otherwise attached to the tank-in-tank. Alternatively, the sidecar could be formed from a closed tank, and that closed tank split to form two sidecar tanks. As shown, the sidecar tank 140 has a floor portion 143 and a top portion 144. The top and floor portions can be constructed from the mold, or could be separately added later.

Figure 5:
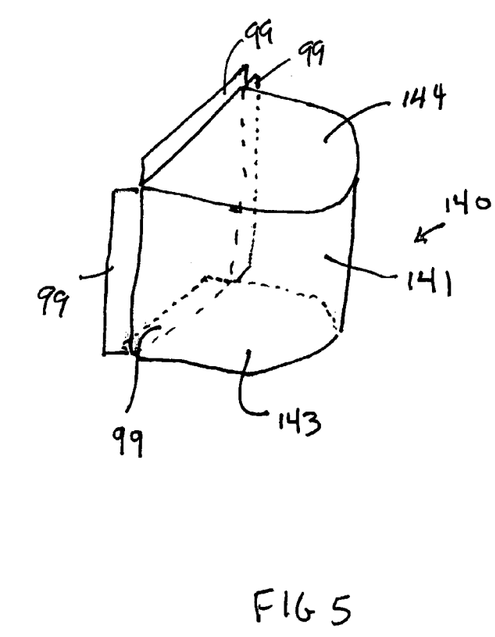
FIG. 5 is a perspective view of the sidecar tank showing the flange sections.

The open sidecar tank 140 can be attached to the tank-in-tank through a variety of methods. A preferred method is to attach sidecar tank 140 with flanges 99, as shown in FIG. 5. The sidecar tank can be built with flange sections 99 at the top, bottom and sides (or a combination) of the tank 140. The flanges 99 should be orientated to allow the flange 99 to be glassed or otherwise attached to the tank-in-tank outer wall. For instance, the bottom flange should be an extension of the bottom portion of the tank (if the sidecar tank bottom is to be level with the tank-in-tank bottom) while the top flange, if used, is orientated a right angles to the top portion 143, forming an upwardly facing portion. This upward facing top flange allows the sidecar tank 140 to be joined at the top of the tank, and hence, when a top flange is used, the sidecar tank 140 is slightly smaller in height than the tank-in-tank to accommodate the flange section, as shown in FIG. 3. Alternatively, the sidecar tank top portion could be placed at the same height as the tank-in-tank. In this instance, the flange 99 could be eliminated or a downward facing lip flange could be utilized, where the lip overlaps the outer wall 105 of the tank-in-tank to allow the lip to be attached to the interior of wall 105. The sidecar tank is then glassed to the tank-in-tank using the flanges, where present. The top portion 143 of the sidecar tank will have an opening cut in to accommodate a manway, later attached. As shown in FIG. 3, the manways are at the same vertical level to accommodate burial of the treatment system.

A comparable 1000 gallon capacity sidecar system to that of the TTT system (shown in FIG. 1) will have an inner tank diameter of about 5.5 feet, an outer cylinder of about 6.9 feet diameter, and a sidecar of length D4 about 2.8 feet, and length D5 of about 5.5 feet. This sidecar system has a footprint of about 9.75 feet long and 6.75 feet wide. In this instance, the capacity of the dosing or post-treatment tank is slightly less than that of the comparable TTT system, however, the "actual" post-treatment volumes can be adjusted by adjusting the level at which the dosing is undertaken. While the footprint is about 1.37 feet longer, there is a savings in raw materials: the sidecar side walls occupy about 61 ft$^2$, while the outer sidewall of the comparable TTT system is about 166 ft$^2$. Hence, there is a tradeoff between footprint and raw material requirements. Alternative embodiments can be utilized by swapping the pre-treatment and post-treatment tanks; that is, the pre-treatment tank would be the sidecar tank, while the post-treatment tank would be the exterior tank in the tank-in-tank configuration.

As described, the tank-in-tank systems are shown as nested cylinders, ovals could also be used, as well as "edge" geometries such as squares or rectangles. However, edge geometries are not preferred for fiberglass construction, but with concrete or similar materials, there is no preference.

As used herein, "tank" refers to a structure capable of retaining fluids when assembled into the unitary treatment system. For instance, consider the sidecar tank shown in FIG. 5. Prior to assembly, the sidecar tank cannot hold fluids, but assembly into a unitary structure creates a closed sidecar tank that will retain fluids. Upon construction, the sidecar tank presents a separate treating volume, in fluid communication through piping with other tanks in the treatment system. Other configurations of the unitary treatment system are possible. For instance, the sidecar tank can contain the clarifier and aerators, with the tank in tank containing the preprocessing volume and the post processing volume (either pre or post processing volume being the centermost tank). However, this arrangement is not preferred, as the sidecar tank's footprint in this configuration is larger, and the internal plumbing gets more complicated. Alternatively, instead of a clarifier structure and aeration, the treatment system can be an aerated fixed film reactor, such as disclosed in pending U.S. patent application Ser. No. 10/447,464, herein incorporated by reference in its entirety. As disclosed, the aerated fixed film reactor, which can be built in various configurations, could be positioned in any of the tanks: the first, second, third or side-car tank. Other embodiments of the invention will occur to those skilled in the art, and are intended to be included within the scope and spirit of the following claims.

We claim:

1. A wastewater treatment system comprising a first tank, a second tank and a third tank, each said tank having a water tight sidewall wall having a top portion, a bottom portion and a wall portion, all in fluid communication through inlets positioned adjacent said top portion of said sidewalls, said wastewater treatment system forming a unitary structure, said first tank and said second tank and said third tank being nested, said first tank being the innermost tank, said third tank being the outermost tank, said first tank having clarifier structure disposed therein separating the interior of said first tank into a quiescent zone and an aeration zone at least one air injector positioned in only said first tank said air injector attached to a source of air, said treatment system having at least one cover, a system inlet and a system outlet, said outlet discharging water from said treatment system.

2. The wastewater treatment system of claim 1 where said system inlet empties into said second tank and said system outlet discharges from said third tank.

3. The wastewater treatment system of claim 1 where said system inlet empties into said third tank and said system outlet discharges from said second tank.

4. The wastewater system of claim 1 further having a dosing pump positioned in one of said second or said third tanks.

5. The wastewater system of claim 1 wherein said nested tanks are substantially concentrically nested.

6. The wastewater treatment system of claim 5 wherein said first and said second tanks sidewalls form cylinders.

7. The wastewater treatment system of claim 1 wherein said unitary structure has a single floor portion shared by said first tank and said second tank.

8. A wastewater treatment system comprising a first tank, a second tank and a third tank, each said tank having a water tight sidewall having a top portion, a bottom portion and a wall portion, all in fluid communication through inlets positioned adjacent said top portion of said sidewalls, said wastewater treatment system forming a unitary structure, said first tank and said second tank being nested, said first tank being the innermost tank, said third tank having a portion of said third tank's sidewall common to said second tank's sidewall, said first tank having clarifier structure disposed therein separating the interior of said first tank into a quiescent zone and an aeration zone, said aeration zone having at least one air injector positioned in said aeration zone, and said treatment system having at least one cover, a system inlet and system outlet, said system inlet adapted for accepting wastewaters for treatment by said wastewater treatment system, said outlet adapted for discharging water out of said treatment system.

9. The wastewater treatment system of claim 8 where said system inlet empties into said second tank and said system outlet discharges from said third tank.

10. The wastewater treatment system of claim 8 where said system inlet empties into said third tank and said system outlet discharges from said second tank.

11. The wastewater system of claim 8 where said clarifier structure is an inverted opened bottom truncated cone.

* * * * *